United States Patent [19]
Conners

[11] 3,798,427
[45] Mar. 19, 1974

[54] AUTOMATIC DECELERATION TO ZERO VELOCITY IN ITERATIVELY COMPUTING NUMERICAL CONTROL SYSTEMS

[75] Inventor: John P. Conners, Fond du Lac, Wis.

[73] Assignee: Giddings & Lewis, Inc., Fond du Lac, Wis.

[22] Filed: Feb. 27, 1973

[21] Appl. No.: 336,267

[52] U.S. Cl............................. 235/151.11, 318/371
[51] Int. Cl........................ G06f 15/46, G05b 19/18
[58] Field of Search ........ 235/151.11; 318/371, 696

[56] References Cited
UNITED STATES PATENTS
3,435,310  3/1969  Bradley............................... 318/685

Primary Examiner—Eugene G. Botz
Attorney, Agent, or Firm—Wolfe, Hubbard, Leydig, Voit & Osann Ltd.

[57] ABSTRACT

Methods and apparatus embodying improvements in numerical control systems of the genus disclosed in United States application Ser. No. 124,356 filed Mar. 15, 1971 in the name of John K. McGee, now U.S. Pat. No. 3,727,191 and particularly for simplifying and rendering more accurate the look-ahead sensing and automatic deceleration of a movable element to zero velocity as it reaches a commanded end point position. The velocity of an element moving toward a numerically defined stopping position is successively reduced to a predetermined fraction or percentage of its previous value during each iteration period once deceleration is initiated in response to comparison of the remaining distance to the end point with a distance which will be traveled during the deceleration phase. The latter distance is found by simple computations involving essentially a constant which is derived directly from the said selected, predetermined percentage. As a result of reducing the velocity by the same predetermined percentage during successive equal periods, the velocity falls in a substantially exponential fashion and the deceleration is thus smooth but consumes relatively little time.

27 Claims, 7 Drawing Figures

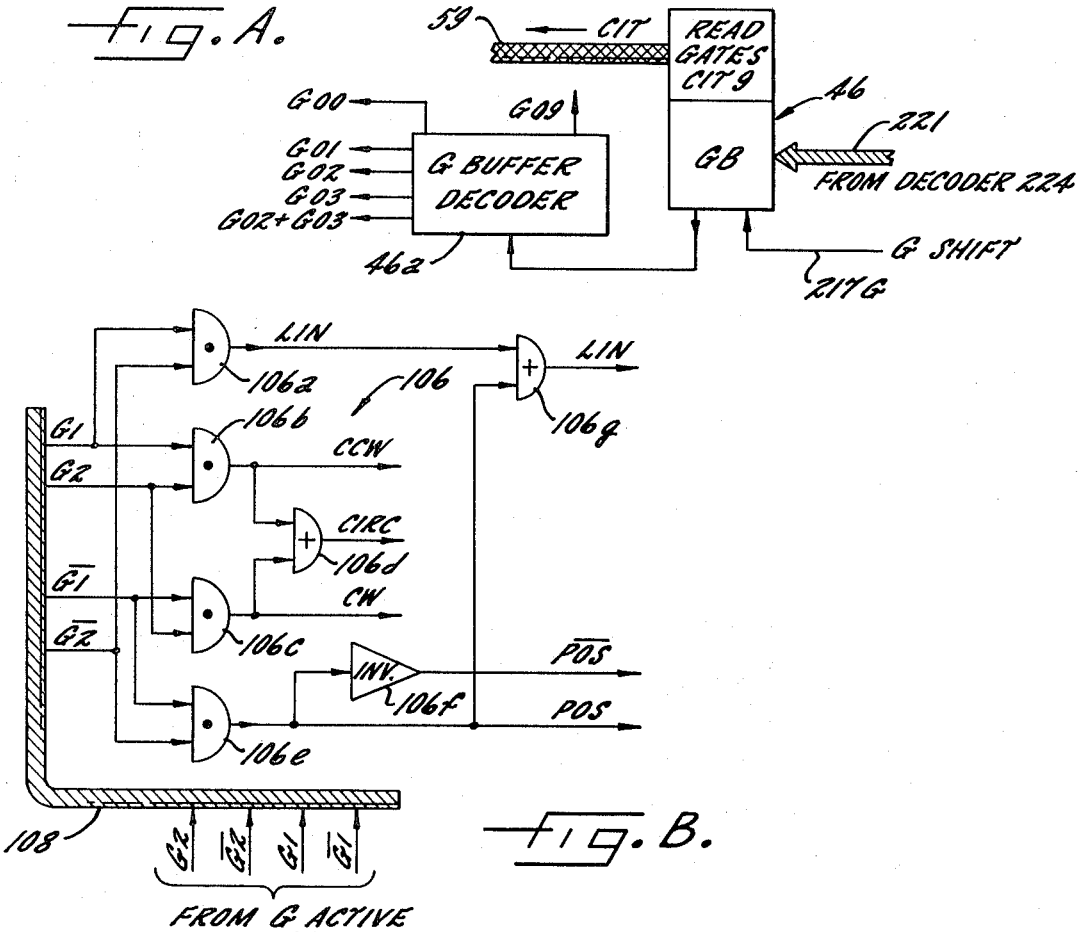
Fig. A.
Fig. B.
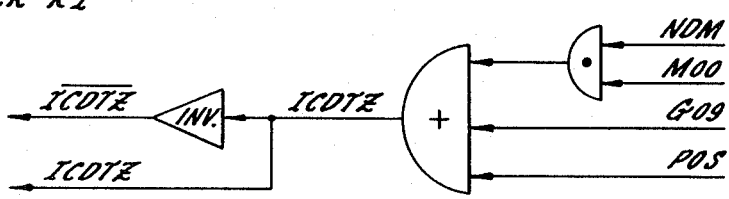
Fig. C.
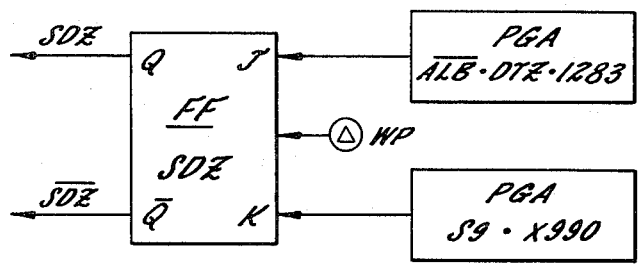
Fig. D.

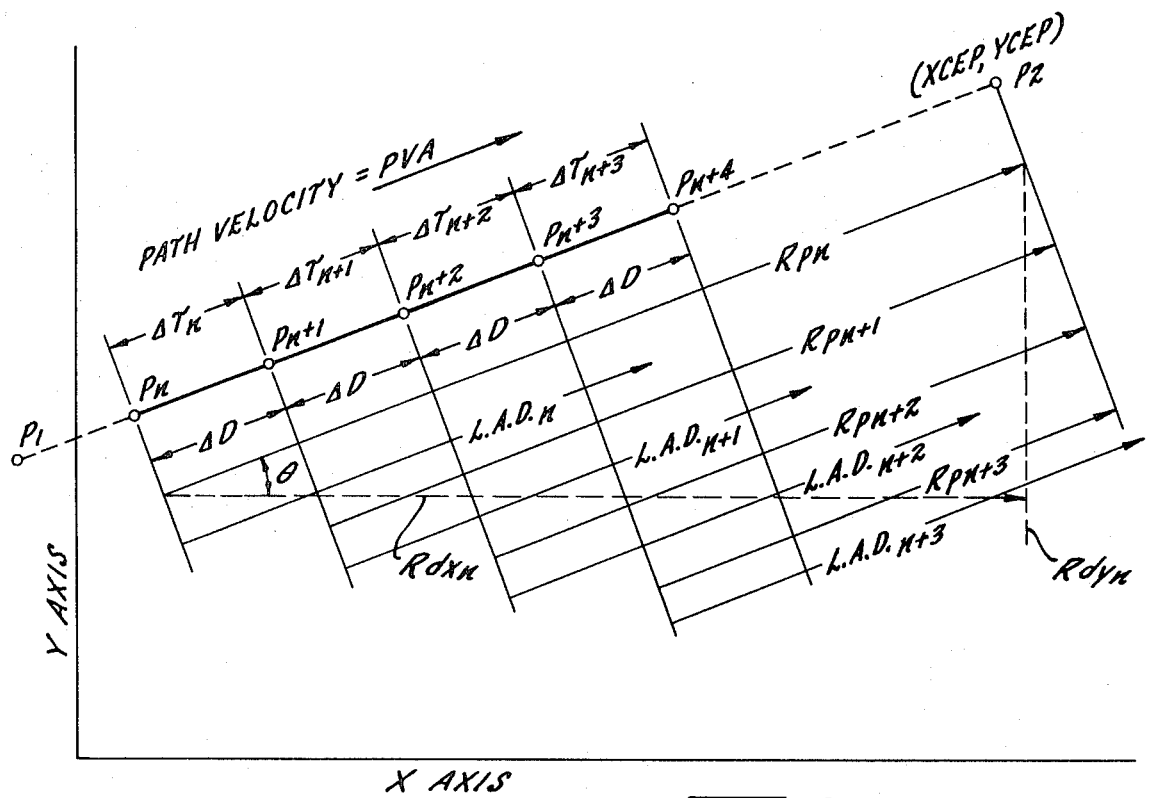
FIG. F.
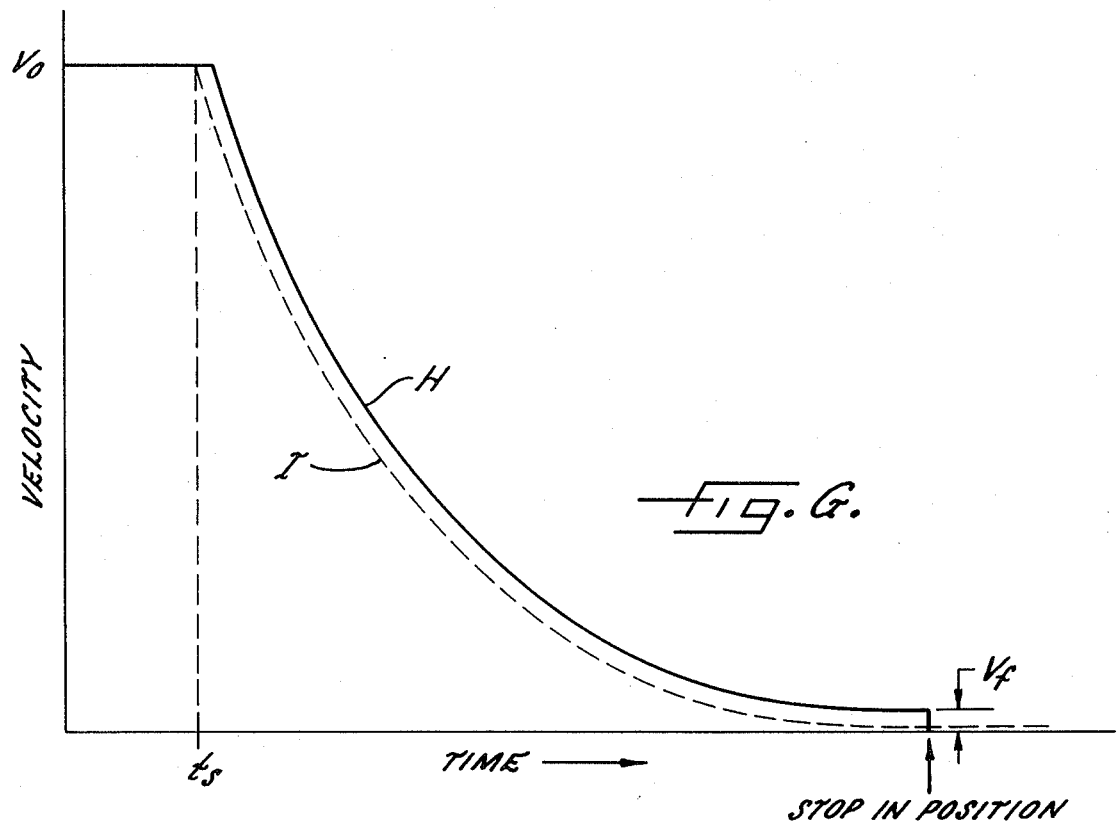
FIG. G.

AUTOMATIC DECELERATION TO ZERO VELOCITY IN ITERATIVELY COMPUTING NUMERICAL CONTROL SYSTEMS

CROSS REFERENCES TO RELATED APPLICATIONS

For a better understanding of the background of the present invention, reference may be made to U.S. Pat. No. 3,656,124 issued in the name of John K. McGee and assigned to the assignee of the present application. This patent, herein called Case A, will provide a basic introduction for the reader to numerical contouring control systems of the iteratively computing type. Moreover, cross reference is herein made to copending United States application Ser. No. 124,356, filed March 15, 1971 in the name of John K. McGee and assigned to the assignee of the present application. That copending application will be called Case B and its disclosure is formally incorporated by reference herein, as set forth below.

BACKGROUND OF THE INVENTION

Field of the Invention

The present invention relates in general to numerical control systems employed with machine tools and the like to translate an element, movable along one or more axes, along a predetermined path through successive end points lying on a desired path, or to successive positions, according to a program of numerical information represented on a record medium such as a punched tape. Although of primary advantage in multiple axis contouring systems, the invention will also find application in single or plural axis point-to-point positioning systems where the path followed in reaching an end point is not especially critical.

More particularly, the present invention relates to automatic acceleration and deceleration in numerical control systems of the iteratively computing type, and especially to improvements in automatic deceleration to a zero velocity at a segment or positioning end point. Indeed, the present invention may be aptly characterized as an improvement over the method and apparatus disclosed in Case B for effecting automatic deceleration.

Description of the Prior Art

Although the disclosure of Case B is incorporated by cross reference herein, no benefit of the Case B filing date is asserted for this application because of any "continuation" relationship. Case B itself, therefore, represents the closest prior art known to applicant. And, since Case B is incorporated by reference herein, no summary of its disclosure is necessary at this point.

SUMMARY OF THE INVENTION

It is the general aim of the present invention to bring forth methods and apparatus for automatically decelerating a numerically controlled movable element which are vastly more simple and less expensive, yet which are more accurate and more nearly optimized to require minimum decelerating time.

In more detail, an object of the invention is to provide for the automatic slowing down of a movable element so that, after initially traveling at any given velocity, it will reach a numerically commanded end point or stopping point with substantially zero velocity —by making the commanded velocity during each successive iteration period $\Delta T$ equal to a predetermined fraction of the velocity in effect during the preceding period. This may be given the short name "constant fraction" deceleration.

Another object is to automatically determine the optimum instant or iteration period at which the element, traveling at any given velocity, should begin constant fraction deceleration, —and especially to achieve this by a look-ahead technique which is mathematically complex but implemented by extremely simple computations and signaling involving essentially a constant number derived from the predetermined fraction of successive velocity reductions.

Still another object is to effect the iterative reduction of the commanded velocity for a movable element in the foregoing fashion by iteratively updating or changing that velocity to a value which is essentially computed and used to determine the instant at which deceleration must be initiated, —thereby further simplifying the required steps and time for performing the computations.

A further object of the invention is to provide for automatically decelerating a movable element to zero velocity in a way such that the successive percentage velocity reductions can be easily changed to suit the characteristics of any particular servo system or controlled machine, and indeed in which the characteristics of the deceleration are automatically made different when the controlled element is being moved in a contouring mode or a positioning mode.

These and other objects and the advantages of the invention will become apparent as the following description proceeds.

BRIEF DESCRIPTION OF THE DRAWINGS

The drawings of Case B, and the brief description of such drawings which appears in Case B, are hereby incorporated by reference. To permit ready differentiation between the drawing figures of Case B and those drawing figures which accompany the present application, the latter figures are designated by alphabetical symbols, and more specifically:

FIG. A is a fragmentary block diagram showing a portion of the elements illustrated in FIG. 9l, but with certain additions or changes;

FIG. B is a fragmentary block diagram corresponding to a portion of FIG. 9f and illustrating certain changes or additions to the corresponding elements shown in FIG. 9f;

Figure 2:
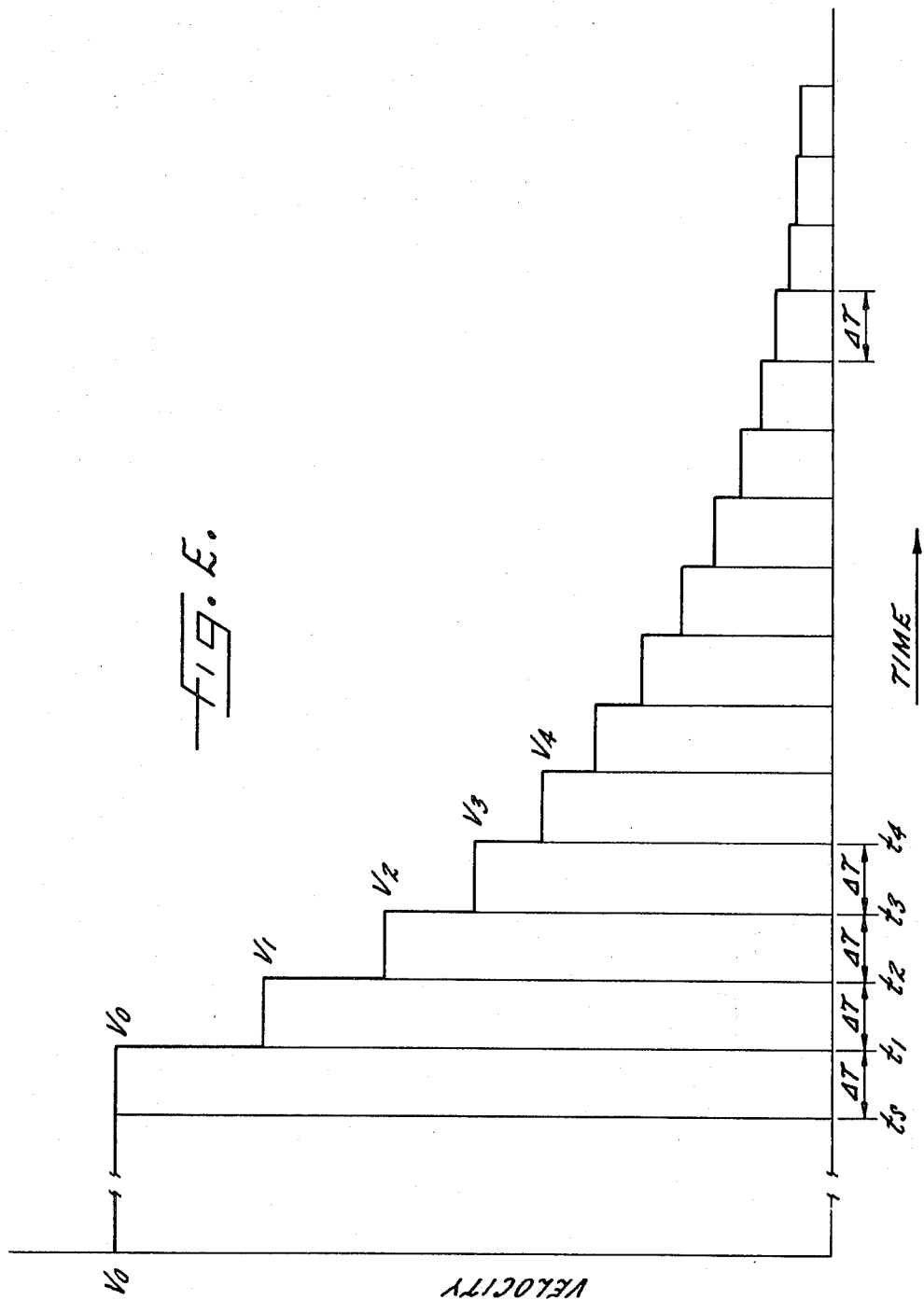

FIG. C is a fragmentary block diagram corresponding to a portion of FIG. 9o and showing an additional input signal which participates in the creation of the ICDTZ and $\overline{ICDTZ}$ signals;

FIG. D is a block diagram illustrating a control flip-flop and its associated program gate arrays, and which may be considered as showing a supplemental addition to FIG. 9n;

FIG. E is a graphical illustration of the manner in which velocity of a movable element is successively decreased in accordance with the present invention, and also geometrically confirming the correctness of the procedure by which a look-ahead distance is herein determined;

FIG. F is a graphical illustration of remaining distances and look-ahead distances as they are computed and signaled during successive iteration periods while a movable member is traveling toward a commanded stopping end point; and FIG. G is a generalized graphical illustration of the exponential manner in which an element is decelerated by progressive reductions in its velocity until it reaches a stopping position while moving at slightly greater than zero speed.

DESCRIPTION OF PREFERRED EMBODIMENTS

Specification pages 1 through 189 of Case B are hereby incorporated by reference into and made a part of the present specification. It will be assumed from this point forward that the reader is familiar with the description, symbols and figure numbers of Case B. Those same symbols and figure numbers will be used herein, and supplemented by the additional symbols and figure letters associated with the present case.

A. Review of the DLAP Determination and Comparison

From Case B specification pages 139 through 168 and FIGS. 24–26, it will be apparent that the computations to arrive at a look-ahead distance DLAP are relatively long and complex. Moreover, they require a relatively great amount of physical hardware in the form of multiple diode program gate arrays. As seen in Chart B and Table II, the lower portion of Mode 1 time column 1000, all of column 1100 and part of column 1200 are used to derive a number DLAP which appears in the register SP1 after time step 1237. Then, during steps 1238 through 1254 the remaining distance XCP + 2ΔY − XCEP (assuming the fast axis is X) is computed and compared with DLAP to set the flip-flop TAD only if that comparison indicates it is time to initiate the decelerating action. The SAD and SAV flip-flops are controlled when DTZ has been previously set to reduce the "time stretch", as described. These computations are, to say the least, rather involved; they require not only a considerable portion of the time which is available during each period ΔT of Mode 1, but also extensive program gate arrays and wiring connections.

B. Supplemental Drawings and Modified Tables

In accordance with the present invention, improved methods and apparatus are provided to effect deceleration of the controlled element to zero velocity —by computations which are less time-consuming, which require less in the way of physical program gate arrays, and which bring about a smoother, more accurate deceleration with little "time stretch". The improved system now to be described will perform deceleration from any velocity to a lower programmed velocity (other than zero) by "next block" action (described above), and yet will always bring the movable element to substantially zero velocity by "this block" operation when any condition so requiring exists. Moreover, the improved system is one which can be placed in either a "positioning" or a "contouring" mode of operation. In the positioning mode, it will cause the fast axis always to run at its maximum traverse rate while making certain that deceleration is initiated and effected so that the element approaches the desired end point position at a creep speed which does not cause intolerable overshoot and hunting.

To practice the improved method and embody the improved apparatus, the flip-flops ANR, TAD, SAV, SAD and the registers LAB and PVB described above are all omitted together with their associated PGA's. The operational steps shown in Chart B and Table II at the bottom of Mode 1 time column 1000, and all of those in columns 1100 and 1200 are eliminated, and those shown in Chart C and Table III supplemented. To make this clear, there are appended as the last pages in the present specification modified Charts B–1 and C–1 together with modified Tables IIA and IIIA, to which reference will be made in describing the simplified apparatus and its improved method of automatically decelerating a movable member to a stop at zero velocity. Tables IIA and IIIA are to be taken as replacing Tables II and III for the embodiment and practice of the present invention.

As a preliminary matter, however, it should be observed that in the practice of the present invention, FIG. 91 is modified to the extent shown in FIG. A. This involves simply the recognition that any block of command data on the program punched tape may include a "positioning mode" code G00 or any of the G01, G02 or G03 contouring mode codes previously described. FIG. A merely indicates by the G00 line extending from the decoder 46a that the G buffer register 46 may receive a G00, G01, G02, G03 or G09 code number when any tape block is read by the tape reader 39 (FIG. 9m).

FIG. B illustrates a modification to FIG. 9f, namely the addition of an AND gate 106e whose inputs are the $\overline{G1}$ and $\overline{G2}$ lines from the G active register R1 which has been previously described. If a block of data transferred to the active registers contains a G00 code, the $\overline{G1}$ and $\overline{G2}$ signals are at a "1" level, and therefore the output POS of gate 106e will reside at a "1" level, with the output $\overline{POS}$ of an associated inverter 106f being "0". Thus, when a block of data in active storage is to be executed in the positioning mode (rather than in one of the contouring modes LIN, CW or CCW), the signal POS will be "1" and the signals CW, CCW, CIRC and $\overline{POS}$ will all be "0". The POS signal resulting from a G00 code will also supply an input to an OR circuit 106g, so that the LIN signal will exist and the system will operate with linear interpolation during positioning. But if the LIN signal exists without POS, then the linear contouring mode (with programmed feed rate) will be in effect.

As shown in FIG. C, the gating previously illustrated in FIG. 9o to produce the ICDTZ signal is modified only to the extent of having an additional POS input to the OR gate. In consequence, the signal ICDTZ will exist when the signal (NDM·M00) or G09 or POS is present. This will inhibit clearing of the DTZ flip-flop under the conditions previously described, and also when a block of data originally containing a G00 positioning code has been transferred to the active registers. As explained below, the system will always cause the controlled element to decelerate to zero (when the flip-flop DTZ has not been cleared) at the end of motion to an end point defined by a block of data containing a positioning mode code G00.

In lieu of the flip-flop TAD (FIG. 9n), a flip-flop SDZ, associated with setting and resetting PGA's is employed as illustrated in FIG. D. As will be noted below, this flip-flop is set to make the SDZ signal a "1" when it is time to "start decelerating to zero".

Additions or deletions to the various PGA's throughout the drawings of Case B are not illustrated by supplemental drawing figures, inasmuch as all such changes will be apparent from comparison of Tables II and III with Tables IIA and IIIA. It will be a simple matter for one skilled in the art to construct PGA's in agreement with the legends of Tables IIA and IIIA.

C. The Ancillary Feature of Automatically Executing Positioning Mode Movements With One Axis At Maximum Axis Velocity When a block of data on the punched tape contains a G00 code (and thus the singal POS exists when that block is transferred into active storage for execution), any programmed feed rate then held in the register FB will be ignored, and instead a traverse feed rate will automatically be put into effect. Deceleration to zero at the end of any movement in the positioning mode will automatically be created since, by definition, a positioning operation is to bring the element to a stop at the commanded end point position. With one axis servo motor operating at its maximum speed, the traverse velocity along the path will be affected by the angle of a path segment extending from the starting to the end point. To determine the path traverse feed rate as a numerical value, the program gate arrays of the present system are supplemented (in a manner made physically clear by Table IIA) so as to produce the operations designated in Mode 1 time column 1100 of Table IIA.

Referring to time step 1127 in Table IIA, the computer 53 is enabled for division by a signal ed and simultaneously the number D (the resultant of the axis components I and J as shown in FIG. 5) is read from register 47 (FIG. 9o) into the computer as a numerator. Thereafter on step 1128 the number I or J is read in as a denominator if the signal FAX or $\overline{FAX}$ respectively exists, and the division sequences within the computer proceed until step 1180 when a "clear divide" signal cd is supplied. Thus at the end of step 1180 the accumulator holds the quotient D/I or D/J depending upon whether the X or Y axis is the fast axis. Although the input numbers D and I or J for this dividing operation are stored in and read from registers 47 and R16 or R17 in decimal form, the computer 53 may be conditioned in a manner familiar to those skilled in the art to accept two decimal form numbers signaled in BCD format and to produce a numerical quotient in the same format. It will therefore be understood that if the fast axis is X or Y (because I is larger than J or vice versa), the number held in the accumulator at the end of step 1180 represents either D/I or D/J, these being respectively equal to $1/\cos\theta$ or $1/\sin\theta$, as made plain by FIG. 5. That quotient is always equal to or greater than 1.0.

On time step 1181, the number representing $1/\cos\theta$ or $1/\sin\theta$ (depending upon whether the fast axis is X or Y) is written into scratch pad register SP1 for future use, but it remains in the accumulator for immediate use in the multiplication next to be described.

Every machine tool, or more accurately, its servos for moving the controlled element along the individual axes will have upper limits or maximums for the individual axis velocities. Merely as a specific example, it may be assumed that the maximum axis velocity $V_{am}$ along either the X or Y axis is 127 inches/min. If it is desired in the positioning mode of operation always to operate with the fast axis velocity at the maximum value $V_{am}$ in order to minimize positioning time, then the resultant path velocity (which will here be called FT, representing a traverse feed rate) will be $V_{am} \times 1/\cos\theta$ or $V_{am} \times 1/\sin\theta$. When $V_{am}$ is, for example, 127 inches/min., these expressions reduce to the simplified form:

$$FT = 127 \times 1/\cos\theta$$

or $$FT = 127 \times 1/\sin\theta$$

Thus, at step 1182 in Table IIA, an emx" signal is supplied to the computer 53 while the accumulator is holding the number $1/\cos\theta$ or $1/\sin\theta$; and on step 1183 the multiplier 127 is read into the computer. The multiplication sequences performed during steps 1183 through 1197 end when the following "clear multiply" signal cmx" is supplied to the computer. Thus, at the end of step 1197 the computer holds the traverse feed rate FT; and on step 1198 this number FT is written into scratch pad register SP3 for future use.

The number FT will be used in lieu of any other programmed feed rate when the system is in a positioning mode and the signal POS exists. Of course, during the early or late stages of the segment execution when automatic acceleration and deceleration are being performed, the actual path velocity PVA may be increasing toward or decreasing from the traverse rate number FT. More specifically, the traverse path feed rate FT will be utilized only if the POS signal exists during Mode 1 when a new feed rate for the block in active storage is first used. See step 1297 in Table IIA where the legend R/SP3 ? POS appears. When the POS signal exists, the value of FT will be read from SP3 and then written into the register PVC on step 1299. As explained above, this will cause, during the early portion of the positioning movement, an increase in the number PVA and acceleration of the controlled element from its previous path velocity (which may have been zero) up to a traverse path velocity FT which results in the fast axis traveling at its maximum speed.

It may be noted from time step 1339 in Table IIA that if the system is in its positioning mode and the signal POS exists, then the multiplier 1.0 is read into the computer 53 instead of the feed rate override percentage number PCF. Thus, in the positioning mode after the multiplication at time steps 1339 through 1354, the product appearing in the accumulator at step 1354 is the number PVC which is equal to the path traverse number FT; and thus the value of FT is written into the register PVC on step 1159. Therefore, the "this block" acceleration will result in an increase in the actual path velocity PVA up to the positioning traverse value FT, and once the element is moving at that traverse velocity, it will so continue until automatic deceleration (to be described below) begins. In other words, during the positioning mode of operation the feed rate override is, in effect, disabled so that the controlled element will move at the full traverse velocity. This is permissible and desirable because the cutter is not in contact with the workpiece.

D. Automatic Deceleration to Zero in the Positioning Mode

As noted above, when a G00 code is read from a block $B_n$ on the tape into the G buffer register 46a (FIGS. 91 and A), that results in the POS signal appearing in FIG. B as soon as the G code information is transferred from buffer to active when execution of the previous block $B_{n-1}$ of data is substantially completed. See Table IIIA for Mode 2 at time steps 2377, 2378 or 2877, 2878. Then, during the following Mode 3 operation, the flip-flop DTZ is enabled (see Table IV at time step 3378). By the time that the next succeeding block $B_{n+1}$ has been read and data processing has been completed at step x698 (Table I), the signal $\overline{ICDTZ}$ from FIG. C resides at a "0" level because POS is a "1", and the flip-flop DTZ is not cleared. Since the flip-flop DTZ is left in its set state during the entire time that a positioning mode motion is being executed, the signal DTZ will result in deceleration of the controlled element to zero velocity before it reaches the commanded segment end point XCEP, YCEP, as hereinafter explained.

The signal DTZ will, of course, also exist in any of the three cases previously described, i.e., if an M00 code has been read as a part of the block of data following that in active storage, if a G09 signal exists, or if data processing for the block following that one in active storage has not been completed. These three cases have been treated fully above, and thus the reasons for and the operations which result in each case causing the signal DTZ to be "1" will not be repeated here.

E. The Method and Apparatus for Causing Deceleration to Zero

In carrying out the present invention, neans are provided to progressively reduce the velocity of the movable element to a predetermined percentage C of its previous value during each time period $\Delta T$. But as a prelude to doing that, it is necessary first to determine how far the element will move (here called LAD) before reaching zero velocity if such deceleration is started from the then-existing velocity value, and to initiate the slowing down procedure when the remaining distance to the end point becomes equal to or less than LAD.

Referring to FIG. E, it may be assumed that the movable element has been traveling at a velocity $V_0$ for some time and that at the instant $t_s$ a decision is made to start decreasing the velocity during each following period $\Delta T$ to a predetermined percentage C of its previous value. During the period $\Delta T$ from instant $t_s$ to $t_1$ the velocity will have a value of $V_0$, but during the period $\Delta T$ from instant $t_1$ to instant $t_2$, the velocity will be $V_1$, where $V_1 = CV_0$, and C is a predetermined fraction or constant less than 1.0. For example, if $V_0$ has a value of 120 inches/min. and C is 0.96 (representing 96 percent), then $V_1$ will be $0.96 \times 120 = 115.2$ inches/min. But if reduction by the same percentage is made at the instant $t_2$, then the velocity value $V_2$ will be $C \times V_1$, —and in the example given $V_2 = 0.96 \times 115.2 = 111.3$ inches/min.

By causing the velocity during each succeeding period $\Delta T$ to be a predetermined percentage C of its previous value, $V_1 = CV_0$
$V_2 = CV_1$
$V_3 = CV_2$
$V_4 = CV_3$, and so on.

Thus, generally stated, $V_{new} = CV_{old}$. The reduction in velocity during any given time period is proportional to the previously existing velocity, so that the controlled element's velocity decreases rapidly at first and then more gradually, in a substantially exponential fashion as illustrated in FIG. E.

The relationships noted above may be expressed entirely in terms of $V_0$ (the velocity at the time the deceleration begins) and C (the preselected and constant percentage number). That is, $V_0 = C^0 V_0$
$V_1 = CV_0$
$V_2 = C^2 V_0$
$V_3 = C^3 V_0$
$V_4 = C^4 V_0$, and so on.

Generally stated, $V_n = C^n V_0$.

Recalling that distance is equal to the product of velocity and time, or more generally that $D = \int V dt$, the distance traveled after the instant $t_s$ in FIG. E may be expressed as the sum of the areas of the individual rectangles, each of which has a base dimension of $\Delta T$ and successive ones of which have heights of $V_0$, $V_1$, $V_2$, etc. Recognizing that theoretically an infinite number of $\Delta T$'s and an infinite number of progressively shorter rectangles will be required for the velocity to be reduced to zero, the look-ahead distance LAD through which the controlled element will travel, after the instant $t_s$ when the deceleration action begins, may be expressed as the summation of a series, viz.:

$$LAD = V_0 \Delta T + V_1 \Delta T + V_2 \Delta T + V_3 \Delta T \ldots V_{\infty} \Delta T$$

(a)

But since each lower velocity is expressible in terms of the constant C and the initial velocity $V_0$, this may be rewritten as a converging geometric series:

$$LAD = C^0 V_0 \Delta T + CV_0 \Delta T + C^2 V_0 \Delta T + C^3 V_0 \Delta T \ldots C^\infty V_0 \Delta T$$

(b)

By factoring, Equation (b) becomes:

$$LAD = V_0 \Delta T (C^0 + C + C^2 + C^3 \ldots C^\infty)$$

(c)

It is known that a geometric series in the form:

$$C^0 + C + C^2 + C^3 \ldots C^\infty = \sum_{n=0}^{n=\infty} C^n$$

(d)

converges to a value of $$1/(1-C)$$

(e)

if $-1.0 < C < 1.0$

This convergence value for such a geometric series is confirmed at page 107 of "Mathematical Handbook of Formulas and Tables" by Murray R. Spiegel, McGraw-Hill Book Company, Copyright 1968. Since in the case treated above, the percentage constant C is less than one and greater than zero, Equation (c) may be rewritten in the very simplified form:

$$LAD = V_0 \Delta T \times 1/(1-C)$$

(f)

Recalling that all of the periods $\Delta T$ are equal and have a preselected value (in the example noted above, 1/50 second which is equal to 1/3000 minute), Equation (f) reduces simply to:

$$LAD = V_0 C_1, \text{ where } C_1 = \overline{\Delta T/(1-C)}$$

(g)

Merely as an example, if $\Delta T$ is numerically equal to 1/3000 minutes and C is 90 percent or 0.9, then the look-ahead distance can be expressed:

$$LAD = V_0 (1/3000)/(1-.9) = V_0/300 \qquad (h)$$

However, there are equivalent ways of expressing the look-ahead distance LAD. Recalling from FIG. 5 that in the present system the path velocity is expressible as $\Delta D/\Delta T$ and the axis velocities are expressible as $\Delta X/\Delta T$ and $\Delta Y/\Delta T$, then, in considering the path velocity for the moment, Equation (g) may be rewritten:

$$LAD = \Delta D_0/\Delta T \cdot \Delta T/(1-C) = \Delta D_0/(1-C), \text{ and} \qquad (i)$$

$$LAD = C_2 \Delta D_0, \text{ where } C_2 = 1/(1-C) \qquad (j)$$

In the example to be described below, it will be assumed that the constant C has a value of 90 percent or 0.9 when deceleration in the positioning mode is to take place, and that C is 0.96 or 96 percent when deceleration in the contouring mode is to take place. A smaller value of C (and more rapid deceleration) is desirable for positioning operations since deviations of the controlled member slightly from the linear path segment may be tolerated so long as it ends up at the desired end point.

Referring next to Chart B1 and Table IIA, it will be seen that the operations for effecting deceleration to zero are carried out during time column 1200 when the system is operating in Mode 1. This means that such operations are repeated once during each $\Delta T$ in Mode 1, but they are effective only if deceleration to zero is required, and they result in actual velocity reductions only if the controlled element has approached so closely to the end point that successive percentage decreases in velocity will bring the element substantially to zero velocity by the time it reaches the end point.

As a first general operation during each Mode 1 $\Delta T$ period, the then-remaining distance from the existing position of the movable element to the segment end point is first derived and signaled. Specifically, on time step 1250 the computer 53 is cleared (CAR) and the end point coordinate on the fast axis for the data block in active storage is read in (R/XCEP ? FAX or R/YCEP ? $\overline{FAX}$). Then, on step 1251, a subtraction signal sx appears and the last macromove position coordinate on the fast axis is read in. There appears in the accumulator at the end of step 1251 the remaining distance $R_{fa}$ to be traveled along the fast axis before reaching the end point, and this may be expressed:

$$R_{fa} = \begin{cases} R_{dx} = XCEP - XCP & \text{if } FAX = 1 \\ R_{dy} = YCEP - YCP & \text{if } \overline{FAX} = 1 \end{cases}$$

Referring to FIG. F, which illustrates a typical segment lying between points $P_1$ and $P_2$, the remaining axis distances when the element is at point $P_n$ are labeled $Rdx_n$ and $Rdy_n$. Since the fast axis in the example of FIG. F is the X axis (because I>J), during the time period $\Delta T_n$, the value of the fast axis remaining distance $R_{fa}$ will be computed as $R_{dx_n}$, and will appear numerically in the accumulator at the end of time step 1251.

Next, on time step 1252 this number $R_{fa}$ is shifted one place to the right (SR1) and written into scratch pad register SP2 (W /SP2) so that the number held both in the accumulator and in that scratch pad is 0.1 $R_{fa}$.

On the next step 1253 that number is read back into the accumulator and added to itself, so that the accumulator holds 0.2 $R_{fa}$.

On step 1254, the number in the accumulator is shifted one place to the right (and becomes 0.02 $R_{fa}$) only if $\overline{POS} = 1$; and then the number 0.1 $R_{fa}$ from SP2 is read in and added. The new number in the accumulator thus becomes:

$0.02\ R_{fa} + 0.1\ R_{fa} = 0.12\ R_{fa}$  if $\overline{POS} = 1$
$0.2\ R_{fa} + 0.1\ R_{fa} = 0.3\ R_{fa}$  if POS = 1

On time step 1255, this latter number, i.e., 0.12 $R_{fa}$ or 0.3 $R_{fa}$, is written into scratch pad register SP2.

On step 1256 the computer is cleared (CAR) and enabled for multiplication (emx''), and the number previously stored in SP1 is read in as a multiplicand. It will be recalled from time step 1181 that register SP1 holds $1/\cos\theta$ or $1\sin\theta$ if the fast axis is respectively X or Y.

Then, on step 1257, the number from SP2 is read in as a multiplier with a "force positive" signal FP which makes the computer treat it as an absolute positive value. This latter number (from step 1255) is either 0.12 $R_{fa}$ if the contouring mode is in effect or 0.3 $R_{fa}$ if the positioning mode is in effect. Of course, the fast axis remaining distance is $R_{dx}$ or $R_{dy}$ if the X or Y axis is the fast axis. Thus, the multiplication performed at steps 1256 through 1276 is:

$\times(R_{dx} \cdot 1/\cos\theta) = 0.12\ Rp$  if FAX = 1, $\overline{POS} = 1$
$0.12 R_{dy} \times (1/\sin\theta) = 0.12\ Rp$  if $\overline{FAX} = 1$, $\overline{POS} = 1$
$0.3 R_{dx} \times (1/\cos\theta) = 0.3\ Rp$  if FAX = 1, POS = 1
$0.3 R_{dy} \times (1/\sin\theta) = 0.3\ Rp$  if $\overline{FAX} = 1$, POS = 1

It is apparent that by these multiplications, the remaining distance $R_{fa}$ along the fast axis is converted into the value of 0.12 Rp or 0.3 Rp, where Rp is the remaining distance along the path. As an example from FIG. F, it may be noted that $$R_{dx_n} \times 1/\cos\theta = Rp_n$$

and, of course, $$0.3\ R_{dx_n} \times 1/\cos\theta. 3\ Rp_n$$

The product in the accumulator has added to it during step 1278 the value of 0.0003 if $\overline{POS} = 1$ or 0.006 if POS = 1. These are predetermined constants M chosen to determine the minimum path velocities (slightly greater than zero) which the controlled element will be approaching just as it reaches the end point, as explained below. Thus, at step 1279 the scratch pad register SP1 has written to it either:

0.12 Rp + 0.0003 if in contouring mode
or
0.3 Rp + 0.0006 if in positioning mode.

The objective of the foregoing is to compare, in effect, the look-ahead distance LAD with the remaining distance Rp on the path to determine if and when the latter becomes equal to or greater than the former. When that condition is detected, it is time to initiate the decelerating action, since at that point in time the controlled element will travel substantially through the remaining distance Rp while progressively slowing down to approximately zero velocity. Moreover, when that condition is detected, a start deceleration signal SDZ is created by setting the flip-flop SDZ (FIG. D). Thus, it may be said that:

If LAD $\geq$ Rp, then set SDZ  (k)

But from Equation (i), this may be rewritten

If $(\Delta D_0)/(1-C) \geq$ Rp, then set SDZ  (l)

Since the controlled element is presently moving at a path velocity of PVA inches per minute represented by the number stored in the PVA register, and since PVA = $\Delta D/\Delta T$, the foregoing may also be written:

If $(PVA \cdot \Delta T)/(1-C) \geq$ Rp, then set SDZ  (m)

If PVA $\geq$ Rp $\cdot (1-C)/(\Delta T)$, then set SDZ  (n)

Assuming specific values for the constants as above described, it may be noted that:

$\Delta T$ = 1/50 sec. = 1/3000 min.  (o)

Moreover, assuming that the constant C is a 0.96 in the contouring mode, and if the minimum velocity constant M = 0.3 is used, expression (n) becomes:

If PVA $\geq$ Rp $\cdot (1-.96)/(1/3000) + 0.3$ then set SDZ  (p)

If PVA $\geq$ 120 Rp + 0.3  then set SDZ  (q)

which is equivalent to

If 0.001 PVA $\geq$ 0.120 Rp + 0.0003 then set SDZ  (r)

On the other hand, if the constant C is assigned the exemplary value of 0.9, and the constant M is assigned a value of 6.0 inches/min., for the positioning mode, then Expressions (p), (q) and (r) become:

If PVA $\geq$ Rp $\cdot (1-.9)/(1/3000) + 6.0$, then set SDZ  (p')
If PVA $\geq$ 300 Rp + 6.0, then set SDZ  (q')
If 0.001 PVA $\geq$ .3 Rp + 0.006, then set SDZ  (r')

To perform such comparison, on step 1280 the computer is cleared and the number PVA is read in from the register R22 (FIG. 9q). It is shifted three places to the right (SR3) on step 1281 so that the accumulator holds 0.001 PVA. Then, on step 1282 a classify signal cx is supplied, and the number from register SP1 (which is 0.12 Rp + 0.0003 if $\overline{POS}$ = 1, or 0.3 Rp + 0.006 if POS = 1) is brought in. An $\overline{ALB}$ signal (meaning that the first number is not less than the second and thus is equal to or greater than the second) will exist during step 1283 only if 0.001 PVA is equal to or greater than (0.12 Rp + .0003) or (0.3 Rp + 0.006) in the contouring or positioning modes, respectively. Thus, the comparision expression (r) or (r') is performed during time step 1282, and the flip-flop $\overline{SDZ}$ is enabled or set during time step 1283 only if the $\overline{ALB}$ signal exists simultaneously with a DTZ signal. It will be recalled that the DTZ signal will be present only if (i) the system is in a positioning mode, with POS = 1, or (ii) an M00 code has been read with the block of data in buffer storage, or (iii) a G09 code has been received with the block of data in active storage and not supplanted by another G code, or (iv) the data processing for the block of data in buffer storage has not yet been completed.

It will now be understood that the comparison performed at step 1282 in net effect results in determining whether or not the lookahead distance LAD is equal to or greater than the remaining path distance Rp during each successive iteration period $\Delta T$. As shown in FIG. F, during period $\Delta T_n$, $LAD_n$ is greatly less than $Rp_n$ and thus the signal SDZ does not appear. During each of the successive periods $\Delta T_{n+1}$, $\Delta T_{n+2}$ and $\Delta T_{n+3}$ the remaining distance computed as $Rp_{n+1}$, $Rp_{n+2}$ and $Rp_{n+3}$ becomes progressively smaller. Yet, if the element is moving along the path at a substantially constant velocity PVA, as assumed and shown in FIG. F, the lookahead distances $LAD_{n+1}$, $LAD_{n+2}$ and $LAD_{n+3}$ remain of the same magnitude. Therefore, it is only during the period $\Delta T_{n+3}$ that the look-ahead distance LAD exceeds the remaining path distance $Rp_3$; as illustrated in FIG. F. Thus, in the example here shown, the signal SDZ will not appear in any of the time periods $\Delta T$ which precede $\Delta T_{n+3}$, but it will be created during that latter period. Once the flip-flop SDZ has been set, it remains set until the entire path segment has been executed and the next block of data is transferred into active storage. It is cleared in a fashion to be noted below.

Once the flip-flop SDZ has been set, the velocity-determining number PVA is made a predetermined percentage C of its previous value during each of the following periods $\Delta T$. This has been explained above with reference to FIG. E, and it is physically accomplished by the operations which are set out for time steps 1283 to 1296 (and 1794 to 1796) in Table IIA. More particularly, on time step 1283, the accumulator is cleared and the number from SP1 is read in. This number is, as noted above, equal to (.12 Rp + 0.0003) in the contouring mode or (.3 Rp + 0.006) in the positioning mode. Thus, on step 1284 that number is shifted three places to the left (SL3) and becomes (120 Rp + 0.3) in the contouring mode, or (300 Rp + 6.0) in the positioning mode. These represent numerical values of Rp $(1-C)/\Delta T + M$ for the contouring and positioning modes, respectively.

The number which is equal to Rp $(1-C)/\Delta T + M$ and which appears in the Answer Register after step 1284 may for convenience be called $PVA_i$ to designate the decremental new velocity value if the preceding velocity value is called $PVA_{i-1}$, where the subscripts i and i−1 respectively designate the present period $\Delta T$ and the preceding period $\Delta T$. Considering the contouring mode when $\overline{POS}$ = 1, the number signaled in the Answer Register after step 1284 is $$PVA_i = 120 Rp + 0.3$$

(s)

But during each period $\Delta T$, the remaining distance Rp is reduced by the value of $\Delta D$, as shown in FIG. F. Therefore, it may be said:

$$Rp_i = Rp_{i-1} - \Delta D_{i-1}$$

(t)

and $$\Delta D_{i-1} = PVA_{i-1} \times \Delta T = (PVA_{i-1})/3000 \quad (u)$$

By substituting Equations ($t$) and ($u$) into Equation ($s$), the result is $$PVA_i = 120\, Rp_{i-1} - (120\, PVA_{i-1})/3000 + 0.3 \quad (v)$$

and since from Equation ($s$)

$$120\, Rp_{i-1} = PVA_{i-1} - 0.3 \quad (sa)$$

Equation ($v$) simplifies to $$PVA_i = PVA_{i-1} - 0.3 - 0.04\, PVA_{i-1} + 0.3 \quad (w)$$

$$PVA_i = 0.96\, PVA_{i-1} \quad (x)$$

Equation ($x$) confirms if C is chosen to be 0.96, then the number $PVA_i$ signaled after step 1284 of time period $\Delta T_i$ is equal to $C \times PVA_{i-1}$, i.e., 96 percent of the PVA value in effect for the preceding period $\Delta T_{i-1}$.

In the positioning mode, the same result is obtained but the number which exists in the accumulator after step 1284 is $PVA_i = (300\, Rp + 6.0)$. This is reflected by the following equations which, except for the constants involved, correspond to those set forth above:

$$PVA_i = 300\, Rp_i + 6.0 \quad (s')$$

$$R_i = Rp_{i-1} - \Delta D_{i-1} \quad (t')$$

$$\Delta D_{i-1} = PVA_i \times \Delta T = (PVA_{i-1})/3000 \quad (u')$$

$$PVA_i = 300^R_{i-1} - (300\, PVA_{i-1})/3000 + 6.0 \quad (v')$$

$$PVA_i = PVA_{i-1} - 6.0 - 0.1\, PVA_{i-1} + 6.0 \quad (w')$$

$$PVA_i = 0.9\, PVA_{i-1} \quad (x')$$

Because in the two axis system here described, the value of Q is updated twice per $\Delta T$ (see time columns 1300 and 1800 in Chart B–1 and Table IIA) and the values of $\Delta X$ and $\Delta Y$ are updated at "staggered" times within each period $\Delta T$ (see time columns X400 and X900 in Chart A and Table I), it is desirable to change the effective value of the velocity number PVA twice during each period $\Delta T$ but by an amount each time equal to one-half of the total decrease required per $\Delta T$ to effect the exponential velocity decrease. In this fashion, the number PVA is kept accurate just prior to the computations for new values of $\Delta X$ and $\Delta Y$, and the composite path velocity number PVA keeps the composite motion of the movable member tracking along the desired path at that velocity.

To obtain this "updating of PVA twice per $\Delta T$", there is first computed and signaled a changeable number VC representing the "velocity change" for each $\Delta T$ period. Then VC/2 is computed and signaled. And when the SDZ signal exists, the then-existing PVA number is reduced by VC/2 twice during each period $\Delta T$. Referring to Table IIA at step 1285, the "next velocity" $PVA_i$ is then stored in the Answer Register. On step 1286, the number PVA (which is $PVA_{i-1}$) is read in subtractively from the PVA register R22 (FIG. 9g) so that the difference $PVA_i - PVA_{i-1} = VC$ is obtained. The number VC will always have a negative sign since $PVA_{i-1} > PVA_i$, and it is written into scratch pad SP1 on step 1287.

Thereafter, on steps 1288 through 1291 the number VC is read in and added to itself, so that successive sums of 2VC, 3VC, 4VC and 5VC appear in the Anwer Register. On step 1292, the number 5VC is shifted right one decimal place in the Answer Register, and so becomes 0.5VC, the latter being written for storage into scratch pad SP1 on time step 1293. Register SP1 thus holds a number equal to one-half of the quantity by which path velocity must be reduced during each period $\Delta T$ to make the velocity fall approximately to zero at the end point. But again, it must be remembered that such velocity reductions are not to be made until the look-ahead distance has exceeded the remaining distance, i.e., until the signal SDZ exists.

On step 1294, the accumulator is cleared and the number PVA (which is $PVA_{i-1}$) is read in. Then on step 1295 the number 0.5VC is read in from SP1 additively. Because 0.5VC is a negative number, the result if PVA + (−.5VC) = PVA −.5VC; and this result is written as a new value in the PVA register --but only if the signal SDZ exists.

As indicated by Table IIA, the operations at steps 1294 to 1296 are repeated in time column 1700 at steps 1294 to 1296. Thus, PVA is decremented by 0.5VC twice per $\Delta T$, and prior to the respective computations of new $\Delta X$ and $\Delta Y$ numbers. The total decrement is VC per $\Delta T$; and since VC is $(1-C) \cdot PVA_{i-1}$, the velocity PVA is reduced to 0.96 or 0.90 of its previous value once SDZ has been set in the specific examples of contouring or positioning operation here given.

Recalling that $\Delta X$ and $\Delta Y$ are computed during each period $\Delta T$ such that $\Delta X = K \cdot PVA \cdot I$ and $\Delta Y = K \cdot PVA \cdot J$, it will be seen that in the contouring or positioning mode the values of $\Delta X$ and $\Delta Y$ are made 0.96 or 0.9, respectively, times their previous values. And as a result, the path increment $\Delta D$ is likewise made 0.96 or 0.9, respectively, times its previous value. Thus, by decrementing PVA to a predetermined fraction of its previous value during each period $\Delta T$, the effect is to similarly decrement $\Delta X$, $\Delta Y$ and $\Delta D$. Since the axis and path velocities are $\Delta X/\Delta T$, $\Delta Y/\Delta T$ and $\Delta D/\Delta T$, the actual axis and path velocities are reduced during each period $\Delta T$ to a predetermined fraction of their previous values.

When in the positioning mode, deceleration begins at that point in time when the remaining path distance Rp is reduced sufficiently that 0.001 PVA becomes greater than 0.3 Rp + 0.006, i.e., when 300 Rp + 6.0 becomes less than PVA. This is simply an equivalent way of initiating the deceleration action when the look-ahead distance LAD becomes greater than the remaining distance Rp, since during any time period $\Delta T$ the distance LAD is equal to $(PVA \cdot \Delta T)/(1-C) - 6.0$, and with the constants here assumed for ΔT and C, the latter expression becomes PVA/300 − 6.0. Once the signal SDZ appears in response to the comparison made, the velocity PVA in each subsequent period ΔT is made 90 percent of its value during the preceding period. The constant M = 6.0 is merely an offset which causes the actual deceleration to be started sooner than it otherwise would be and so that the element is approaching a minimum or final velocity $V_f$ of 6 inches/min. as the element approaches the end point and Rp becomes zero. When such a close approach is reached, however, then a Zone A or Zone B detection is made (as previously described with reference to FIGS. 18 and 19 and column 1 of Tables II and IIA). And when this occurs, the remaining distance to the end point along the fast axis will be less than ΔX or ΔY by the time that the system is placed in Mode 2, and time column 2300 or 2800 in Table IIIA is reached.

If the signals POS or CYSP exist (meaning the system is in the positioning mode or an M00 code has been read, or processing of the data in buffer storage has not been completed), then two major operations are performed during Mode 2. First, the dynamically changing commanded part coordinate numbers XCP and YCP are set to be equal to the end point coordinates XCEP and YCEP. Secondly, the values of ΔX, ΔY and PVA are all set to zero so that all motion due to micromove updating (previously described) ceases. On the following "tenth updates" of the servo command numbers XSC and YSC (see columns x400 and x900 in Table I) the latter are thus driven to be equal to the lower order digits of the end point coordinates XCEP and YCEP. The servo systems will thus cause the movable element to home in to the commanded end point position coordinates, even though the actual position of the movable element is very slightly displaced therefrom. In other words, the controlled element ends up at precisely the commanded end point position even though it approaches the latter at a relatively large minimum speed of 6.0 inches/min.; and this is accomplished because the servo command numbers XSC and YSC are driven to be equal to the end point coordinates XCEP and YCEP after the element is within the dynamic control range of the servo systems.

More specifically, with reference to Table IIIA, it may be noted that the system operates in Mode 2 to transfer data during time columns 2300 and 2800 if the end of block counter is in its state S7. In column 2300 at time step 2373, the computer is cleared and the end point coordinate XCEP is read in. The value of XCEP is written into the register XCP on time step 2374 but only if the signal S7 exists in combination with POS or CYSP. Correspondingly on step 2374 the accumulator is cleared, the number YCEP is read in, and then written on step 2375 as a new value of YCP but only if the signal S7 exists simultaneously with POS or CYSP. In this fashion, the dynamically changing commanded position numbers XCP and YCP are made precisely equal to the end point coordinates XCEP and YCEP. During the following "tenth updates" in time columns x400 and x900 (see Table I), the values of XCP and YCP are transferred directly into the XSC and YSC registers, respectively. This action occurs if the data block in active storage produces a POS signal and the positioning mode of operation is in effect; and it also occurs whenever the CYSP signal exists to signify that complete stopping and shutdown of the system is required because either (a) an M00 signal has been received or (b) the data processing for the block in buffer storage has not been completed. See FIG. 9o where either of these conditions is shown to set the flip-flop CYSP and produce the signal CYSP = 1.

Further with reference to Table IIIA, it will be seen that the accumulator is cleared on step 2375 (or 2875) and thus holds the numerical value of zero. Then, on step 2376 (or 2876) the zero value is written into the ΔX, ΔY and PVA registers if either the POS signal or the CYSP signal exists. With ΔX, ΔY or PVA all set to zero, the micromove and macromove updating which occurs during every ΔT as designated in the upper portion of Table I is, in effect, "turned off". The numbers XCP, YCP, XSC and YSC cannot change and the movable element will remain stationary once the servos have locked it in the positions represented by the servo command numbers XSC and YSC. But, as noted above, these latter numbers (or at least their lower order digits) are now equal to XCEP and YCEP so the movable element stops at the end point position.

Of course, if neither the POS nor the CYSP signal exists, then the operations set out at steps 2373 through 2376 in Table IIIA do not occur, and a normal transfer of data as previously described for Modes 2 and 3 takes place. That is, at steps 2376 through 2382 (and steps 2876 through 2872) the operations proceed as previously described with reference to Table III.

It may be observed from Table IIIA that if the positioning mode is called for by a G00 code in a given block of data, thereby resulting in a POS signal during active execution of that block, the system will normally come to a halt at the end point position, and thereafter the next block of data in buffer storage will be transferred to the active registers and the tape reader will be restarted. This occurs in the normal sequences previously described, unless signals NDM · M00 or S9 · $\overline{DR}$ have set flip-flop CYSP to stop the entire system. However, it is entirely possible for a G00 code and an M00 code to be placed in the same block of program data. In this event, both the POS signal and the CYSP signal will exist when the system reaches Mode 2 after executing that block of command data. In such circumstances, the entire system will come to a halt, as previously described with reference to the M00 code, and the tape reader will not be automatically restarted. A human operator may initiate the operation of the system by momentarily closing a start switch, as previously described.

In the event that a second motion is to be executed by the movable element —after completing one segment after the element has stopped at the end of that segment—, a succeeding block of data (then in buffer storage) will be transferred during Mode 3 and immediately executed (because no M00 signal exists). It is thus necessary to clear or reset the flip-flop SDZ before the system re-enters Mode 1. The legend "CTAD ? S9" presently appears in Table I at time step x990. Since, in accordance with the present disclosure a flip-flop by the name TAD is not employed, that legend and the corresponding PGA may be deemed eliminated for purposes of the present invention, and in its place a legend "CSDZ ? S9" inserted. A corresponding PGA is provided (FIG. D) to clear the flip-flop SDZ on the condition x990 · S9 just after the system leaves Mode 3 and just before it enters Mode 1.

As noted above, once the look-ahead comparison has produced the signal SDZ during time step 1293 (Table IIA) because deceleration to zero is required, then the velocity-determining command number PVA is changed (on time steps 1296 and 1796, Table IIA) to a value which is a predetermined fraction of its previous value. This directly causes the smooth exponential deceleration described above. Under these conditions, however, the determination of the PVA number in time columns 1300 and 1800 of Table IIA is rendered ineffective, because any change in the number PVA to a new value on time step 1367 or 1867 cannot occur unless the signal $\overline{SDZ}$ exists. In other words, the velocity-controlling number PVA is adjusted or changed either on time step pair 1296, 1796 or on time step pair 1367, 1867 but never on both pairs. If deceleration to zero is occurring, PVA is decremented on time steps 1296 and 1796; but under all other conditions PVA is changed (or left at its previous value) on time steps 1367 and 1867, thereby taking into account the feed rate override percentage number PCF and producing, if necessary, the above-described "next block" acceleration or deceleration.

In the foregoing discussion, it has been stated for ease of understanding that the comparison of 0.001 PVA with 0.12 Rp + 0.0003 or 0.3 Rp + 0.006 on time step 1282 —and which in general terms is a comparison of PVA with Rp (1−C)/ΔT + M —is, in net effect, a comparison to determine when the look-ahead distance LAD becomes equal to or greater than the remaining distance. Viewed in another way, however, this is a comparison of one velocity value with another velocity value. That is, in the preferred practice of the invention a first changeable number PVA, proportional by a predetermined factor to the desired velocity, is signaled during each period ΔT. The element is moved by a macromove increment ΔD during each period ΔT so that its velocity ΔD/ΔT is kept proportional by the same factor to the number PVA. Then, a second changeable number Rp is signaled during each period ΔT, and from the latter there is derived and signaled a third changeable number Rp (1−C)/ΔT + M. The minimum velocity constant may be omitted from this expression, if desired, as will become apparent below. But in any event, the third changeable number represents a "scheduled" velocity at which the element should be moving if it is to reach the end point at zero velocity as a result of deceleration over the then-remaining distance Rp by a process of having the velocity reduced to a predetermined fraction C during each of the succeeding periods ΔT. Then, with the third number so derived and signaled, the method and apparatus of the preferred embodiment cause the deceleration to be initiated and carried out by the simple procedure of setting the first number PVA equal to the "scheduled velocity" during any time period in which the first number exceeds the third number. Viewed in this sense, look-ahead distance LAD need not actually be computed, but the "scheduled velocity" is derived from the look-ahead distance relationship $$LAD = V_0 \cdot \Delta T \sum_{n=0}^{n=\infty} C^n = V_0 \cdot \frac{\Delta T}{(1-C)}.$$

Moreover, and as noted below, the first number need not directly represent the desired velocity PVA but may be proportional thereto. Thus, the first number may be ΔD, particularly in a single axis system, since ΔD = PVA·ΔT.

The apparatus and methods described above with exemplary reference to a two axis system may be applied equally well in either a single axis system or one having more than two axes. Moreover, they may be applied in a system which functions only in the positioning mode or only in the contouring mode, both modes being described above to illustrate the fact that the constant C and the minimum velocities (here exemplified as 0.3 and 6.0 inches/min.) can be readily changed to suit the characteristics of different machines and servos by changing the values of numerical constants read in during the signal manipulation sequences. While the specific and exemplary signal manipulation sequences here described deal with a velocity PVA which is the resultant of two axis velocities ΔX/ΔT and ΔY/ΔT, and with path increments ΔD which are the resultant of two axis increments ΔX and ΔY, the invention is generically applicable to other specific cases such as (a) a single axis system wherein there is no ΔY and thus PVA represents X axis velocity and ΔD is equal to ΔX, or (b) a system having more than two axes and wherein PVA is the resultant of three or more axis velocities. To make this clear, one may consider that all of the foregoing equations and signal manipulations which refer to ΔX, ΔY or ΔD are performed with reference to motion along a path U in increments of ΔU/ΔT, where U represents a path which lies along either a single axis or the resultant vector of motions on two or more axes. Thus, for example, Equation (i) above may be generically written $$LAD = \Delta U/(1-C) \quad (i')$$

and Equation (l) above may be generically written $$\text{If } \underline{\Delta U/(1-C)} \geq \underline{Rp} \quad \text{then set SDZ} \quad (l')$$

or $$\text{If } \Delta U \geq Rp(1-C) \quad \text{then set SDZ} \quad (l'')$$

where U represents either a position along a resultant path D or a single axis path X or Y, and Rp represents the remaining distance $U_{end\ point} - U_{present\ position}$. Thus ΔU represents either an increment ΔD along a resultant path or an increment ΔX or ΔY along a single axis path, with the element traveling at a velocity of ΔU/ΔT = PVA along such path. In the claims which are appended hereto, therefore, references to a path U, to increments of ΔU, and to a velocity which is PVA = ΔU/ΔT are intended to be generic to either single axis or plural axis resultant paths. Such claims will be readily understood by substituting ΔU into the several equations and expressions set out above.

With the foregoing in mind, a few alternative embodiments and equivalents of the specific and exemplary embodiment treated above may be briefly described. It will be seen from Equations (f) and (h) above that $$\text{LAD}_i = \text{PVA}_i \cdot \Delta T \cdot 1/(1-C) \tag{1}$$

$$= \text{PVA}_i/300 \text{ if } C = 0.9 \text{ and } \Delta T = 1/3000 \tag{2}$$

The comparison to be made to determine the instant at which deceleration is initiated is If $\text{LAD}_i \geq \text{Rp}$ then set SDZ $\tag{3}$ where $\text{Rp} = U_{ep} - U_{pp}$, $\tag{4}$ the subscripts ep and pp designating "end point" and "present position" as measured along the path U. And, once the SDZ signal appears, the value of $\text{PVA}_i$ is to be set equal to $C \times \text{PVA}_{i-1}$ during each period $\Delta T$.

This makes it possible to perform the comparison of Expression (3) directly and in a fashion equivalent to that designated at steps 1250 to 1296 and 1794–1796 in Table IIA. In lieu of the sequences there shown, the PGA's associated with the computer 53 and the various active registers of the system are wired to produce the following signal manipulations:

| Time Step | Operation | Result |
|---|---|---|
| 1267 | CAR, R/U$_{ep}$ | |
| 1268 | sx, R/U$_{pp}$ | |
| 1269 | W/SP1 | Put Rp=U$_{ep}$−U$_{pp}$ in SP1 |
| 1270 | CAR, emx″, R/PVA | |
| 1271 | R/.333 | Divide by PVA by 300 assuming C=.9, per |
|  | MULTIPLY | Equation (2) |
|  | ↓ | |
| 1284 | cmx″, SL2 | Acc. Holds LAD =PVA/300=PVA·ΔT/(1−C) |
| 1285 | cx, R/SP1 | Compare Rp against LAD |
| 1286 | ESDZ ? AGB·DTZ | Set SDZ if LAD ≥ Rp |
| 1287 | CAR, R/PVA | |
| 1288 | cx, R/6.0 | Compare PVA against 6.0 |
| 1289 | SL1 | Signal .1 PVA |
| 1290 | W/SP2 | Put .1 PVA in SP2 |
| 1291 | CAR, R/PVA | Compute .9 PVA |
| 1292 | sx & R/SP2 | |
| 1293 | W/PVA ? AGB· SDZ | Write PVA$_{new}$ = .9 PVA$_{old}$ if SDZ and if PVA$_{old}$>6.0 |

The foregoing will be self-explanatory, and it need only be observed that the look-ahead distance LAD signaled as $(\text{PVA}\cdot\Delta T)/(1-C)$, i.e. as PVA/300 when $\Delta T$ is 1/3000 min. and $C = 0.9$, is compared with the remaining distance Rp. The signal SDZ is created when LAD is greater than or equal to Rp. Thereafter, during each $\Delta T$ the value of PVA is decremented to $C \times \text{PVA}_{old}$, e.g., to 0.9 PVA if C=0.9,—but when PVA has been reduced to 6.0 inches/min. then the decrementing is terminated so that the movable element moves to the end point at 6.0 inches/min. The foregoing may be used to advantage in positioning mode operations for a single axis; and it will serve adequately in plural axis systems even though it does not provide two "staggered" changes of PVA during each period $\Delta T$.

In the case where the path U is a single axis, it is actually unnecessary to have a separately signaled velocity number PVA. Recalling that $\text{PVA} = \Delta U/\Delta T$ and that $\Delta T$ is a constant, here chosen for example as 1/3000 min., it is possible to determine and signal LAD directly from $\Delta U$, according to Equation (i′). In such an arrangement, the PGA's associated with the computer 53 and the various active registers of the system are wired to produce the following sequences (in lieu of those shown at 1267 to 1296 and 1794 to 1796 in Table IIA):

| Time Step | Operation | Result |
|---|---|---|
| 1267 | CAR, R/U$_{ep}$ | |
| 1268 | sx, R/U$_{pp}$ | |
| 1269 | SL2, W/SP1 | Put .01 R$_p$ = .01 (U$_{ep}$−U$_{pp}$) in SP1 |
| 1270 | CAR, R/ΔU | Compute .01LAD = ΔU/100(1−C) = ΔU/100x.1 =.1ΔU |
| 1271 | SL2 | Acc. holds .01 LAD = .1ΔU, where C = .9 |
| 1272 | W/SP2 | Put .1ΔU in SP2 |
| 1273 | cx, R/SP1 | Compare .01 LAD against .01 R$_p$ |
| 1274 | ESDZ ? ALB·DTZ | Set SDZ if LAD ≥ R$_p$ |
| 1275 | CAR, R/ΔU | |
| 1276 | cx, R/.002 | Signal AGB if ΔU>.002 |
| 1277 | sx, & R/SP2 | Signal .9ΔU=66 U−.1ΔU |
| 1278 | W/ΔU ? AGB · SDZ | Write Δ U$_{new}$=.9ΔU$_{old}$ if SDZ and if velocity is greater than 6.0″/min. because ΔU>.002 |

Again, the foregoing will be self-explanatory, except that it should be recognized that in single axis positioning the computation of $\Delta U = K \cdot \text{PVA} \cdot U_{component}$ need not be performed during each period $\Delta T$, since no $\sin\theta$ or $\cos\theta$ factor is involved. In these circumstances, changing $\Delta U$ directly controls the axis velocity, since that velocity is always $\Delta U/\Delta T$ or 3000 $\Delta U$ if $\Delta T$ is constant at 1/3000 min. Thus, in the foregoing sequences, LAD is compared against Rp by comparing $\Delta U/(1-C)$ against Rp, i.e., comparing 0.1 $\Delta U$ against Rp/100 if C = 0.9. Once SDZ has been set as a result of that comparison, $\Delta U$ is made $C \times \Delta U$ (e.g., 0.9 $\Delta U$) during each successive $\Delta T$, except when $\Delta U$ is reduced to 0.002 inches (and the velocity is reduced to 6.0 inches/min.) then the low speed is held until the end point is reached.

The last tabulation of steps set out above may be further physically embodied and carried out in an alternative and equivalent way:

| Time Step | Operation | Result |
|---|---|---|
| 1267 | CAR, R/U$_{ep}$ | where C=.9 and 1−C=.1, |
| 1268 | sx, R/U$_{pp}$ | put .1 Rp=Rp (1−C) in SP1 |
| 1269 | SL1 | |
| 1270 | W/SP1 | |
| 1271 | cx, R/ΔU | Compare .1 Rp against ΔU, i.e., ΔU against Rp (1−C) |
| 1272 | E SDZ ? ALB · DTZ | Set SDZ if LAD ≥ Rp, i.e., if ΔU ≥ Rp (1−C) |
| 1273 | CAR, R/ΔU | Read ΔU |
| 1274 | cx, R/.002 | Signal AGB if ΔU>.002 |
| 1275 | CAR, R/SP1 | |
| 1276 | W/ΔU ? AGB·SDZ | Write ΔU$_{new}$=Rp (1−C) if SDZ and ΔU$_{old}$>.002 |

In the foregoing, the decrementing of the velocity during each period $\Delta T$ to C times its previous value is accomplished assuming C = 0.9) by setting $\Delta U$ directly equal to Rp (1−C), i.e., to the value 0.1 Rp. This makes $\Delta U_{new}$ equal to 0.9 $\Delta U_{old}$. Of course, this is done only after SDZ is signaled, i.e., after $\Delta U \geq \text{Rp} (1 - C)$ and only if $\Delta U > 0.002$. The latter condition assures that $\Delta U$ is reduced no lower than 0.002 and that the velocity is reduced no lower than $0.002/\Delta T = 6.0$ inches/min. This minimum velocity limit may be obtained by omitting the comparison at step 1274 and adding the constant 0.002 after step 1269 so that SP1 has written into it the value of 0.1 Rp + 0.002. Then the operation at 1276 would become W/ΔU ? SDZ; and the minimum value to which $\Delta U$ could fall would be 0.002 inches, resulting in a minimum velocity of 0.002 inches/ΔT = 6.0 inches/min.

From the foregoing, it will now be seen that the present invention provides automatic deceleration to zero in a fashion which requires relatively simplified apparatus and relatively simple operational steps. As illustrated generally in FIG. F, when a movable element is traveling along a path U at any given velocity $V_0$ because it is kept dynamically in agreement with changing position commands which designate a position changing along the U path at a rate of ΔU/ΔT, then deceleration is automatically initiated at instant $t_s$, and the velocity smoothly decreases in an exponential fashion with time, as illustrated by curve H in FIG. F. While the theoretical decreasing velocity curve I illustrated by dashed lines in FIG. F would require theoretically an infinite time to reach zero velocity and the end point, the provision for locking the velocity at some minimum or final value $V_f$, as described, results in the controlled element moving a selected creep speed when the final position is reached, as shown by curve H. Thereafter, the servo position command numbers cease to change (unless a new block of data is immediately brought into active storage) and the servo action corrects any undershoot or overshoot to stop the element precisely at the end point.

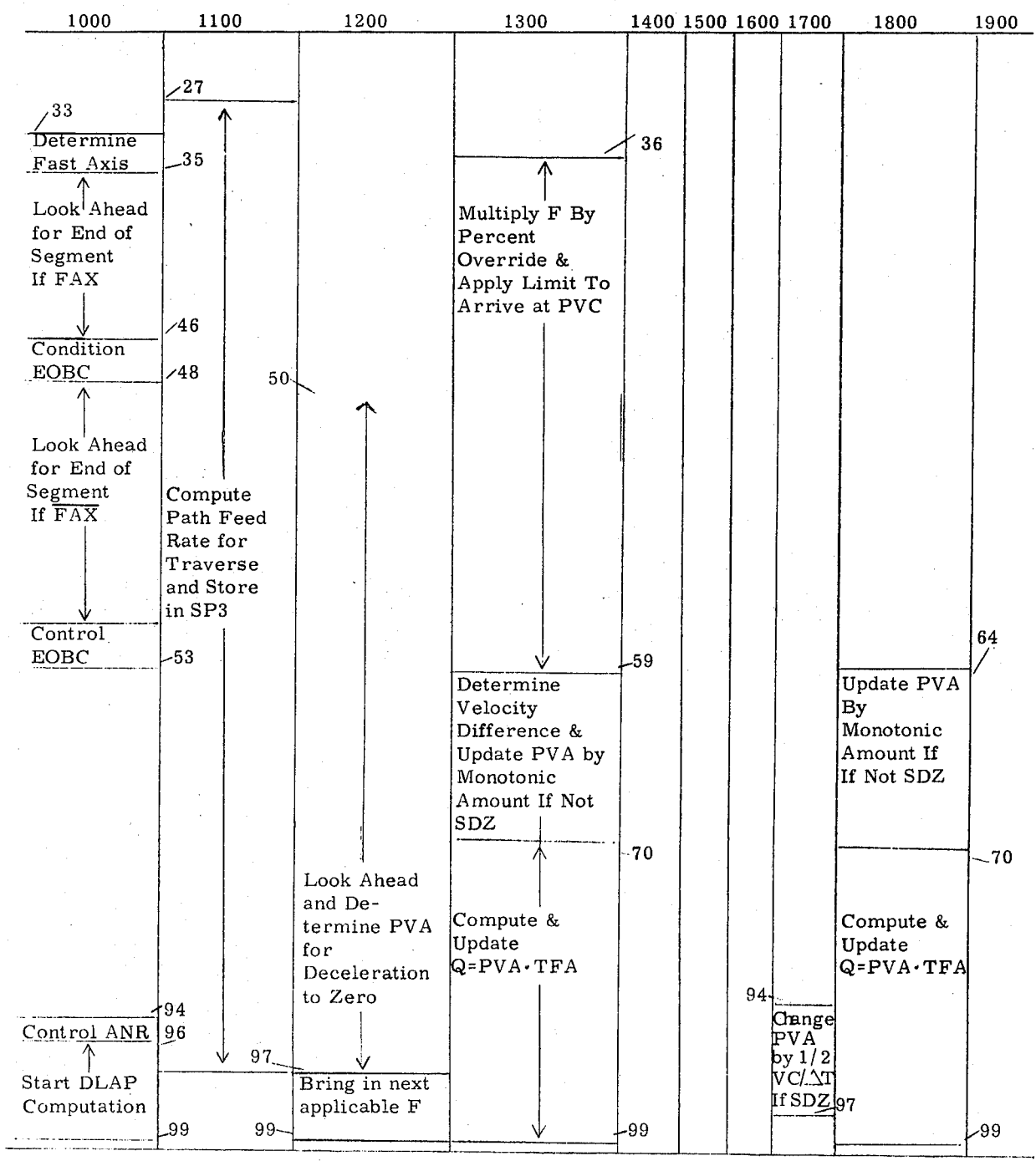

CHART B-1

FUNCTIONAL OPERATIONS
PECULIAR TO MODE 1

TABLE IIA
STEPS PECULIAR TO MODE 1

| | 1000 | 1100 | 1200 | 1300 | 1800 |
|---|---|---|---|---|---|
| 1 to 25 | | | | | |
| 26 | | | | | |
| 27 | ed, R/D | | | | |
| 28 | R/I ? FAX, R/J ? $\overline{FAX}$ | | | | |
| 29 | ⟨ | | | | |
| 30 | | | | | |
| 31 | | | | | |
| 32 | | | | | |
| 33 | R/I | | | | |
| 34 | cx, R/J | | | | |
| 35 | E FAX ? AGB, CFAX ? ALB | | | | |
| 36 | CAR, R/XCP ? FAX, R/YCP ? $\overline{FAX}$ | | $emx''$ | | |
| 37 | | | R/PVC ? IFA | | |
| 38 | sx, R/XCEP ? FAX R/YCEP ? $\overline{FAX}$ | | | | |
| 39 | E ACNX ? COT(-), CACNX ? $\overline{COT}$(-) | | R/PCF ? $\overline{POS}$ R/1.0 ? POS | ← | |
| 40 | R/$\Delta$X ? FAX R/$\Delta$Y ? $\overline{FAX}$ | | | | |
| 41 | R/$\Delta$X ? FAX, SL1 ? $\overline{FAX}$ | | | | |
| 42 | SL1 ? FAX, R/$\Delta$Y ? $\overline{FAX}$ | | | | |
| 43 | R/$\Delta$X ? FAX R/$\Delta$Y ? $\overline{FAX}$ | | | | |
| 44 | Ditto | | | | |
| 45 | Ditto | | | | |
| 46 | Ditto | | | | |
| 47 | Adv. S2 ? S1·$\overline{SST}$·CYST | | | | |
| 48 | R/$\Delta$Y·FAX, R/$\Delta$X ? FAX Adv. S3 ? S2·CYST | | | | MULTIPLY |
| 49 | R/$\Delta$X ? FAX, R/$\Delta$Y ? $\overline{FAX}$ | | | | |

PAGE 2 OF TABLE IIA,

| # | | | | |
|---|---|---|---|---|
| 50 | R/ΔX ? $\overline{FAX}$, R/ΔY ? $\overline{FAX}$ | | CAR, R/XCEP ? FAX R/YCEP ? $\overline{FAX}$ | |
| 51 | Ditto | DIVIDE | sx, R/XCP ? FAX, R/YCP ? $\overline{FAX}$ | |
| 52 | Ditto | | SR1, W/SP2 | |
| 53 | Adv. S2 ? S1 $\overline{SST}$ CYST | | R/SP2 | |
| 54 | | | SR1 ? $\overline{POS}$, R/SP2 | |
| 55 | | | W/SP2 | cmx" |
| 56 | | | CAR, emx, R/SP1 | |
| 57 | | | FP & R/SP2 | cx, R/180 |
| 58 | | | | CAR & R/180 ? AGB·$\overline{POS}$ |
| 59 | | | | W/PVC, sx, R/PVA, CVD |
| 60 | | | | EVDM ? COT(-), cx, R/3.0 |
| 61 | | | | EVDA ? AGB, cx, R/0.3 |
| 62 | | | | EVDB ? AGB·$\overline{VDA}$, cx, R/0.1 |
| 63 | | | | EVDC ? AGB·$\overline{VDA}$·$\overline{VDB}$ |
| 64 | | | | CAR, R/PVC ? VDA·VDB·VDC   CAR, R/PVA ? VDA + VDB + VDC   R/PVA |
| 65 | | | MULTIPLY | sx ? VDM, R/1.0 ? VDA R/0.1 ? VDB R/.01 ? VDC |
| 66 | | | | CAR ? $\overline{COT(-)}$ ↑ |
| 67 | | | | W/PVA ? $\overline{SDZ}$ ↑ |
| 68 | | | | CAR ↑ |
| 69 | | | | ↑ |
| 70 | | | | emx', R/PVA ↑ |
| 71 | | | | |
| 72 | | | | |
| 73 | | | | R/TFA ? $\overline{S4}$ |
| 74 | | | | R/TFB ? $\overline{S4}$ |
| 75 | | | | |
| 76 | | | cmx" | |
| 77 | | | | MULTIPLY → |

PAGE 3 OF TABLE IIA

| | | | |
|---|---|---|---|
| 78 | | | |
| 79 | | R/.0003 ? $\overline{POS}$ | |
| 80 | cd | R/.006 ? POS | |
| 81 | W/SP1 | W/SP1 | |
| 82 | emx" | CAR, R/PVA | |
| 83 | R/127 | SR3 | |
| 84 | | cx, R/SP1 | |
| 85 | | ESDZ ? $\overline{ALB}$·DTZ, CAR, R/SP1 | |
| 86 | | SL3 | |
| 87 | MULTIPLY | sx, R/PVA | |
| 88 | | W/SP1 | |
| 89 | | R/SP1 | |
| 90 | | R/SP1 | |
| 91 | | R/SP1 | |
| 92 | | R/SP1 | |
| 93 | | SR1 | |
| 94 | | W/SP1 | |
| 95 | cmx" | CAR, R/PVA | cmx' |
| 96 | | R/SP1 | W/Q ? $\overline{S4}$ |
| | | W/PVA ? SDZ | W/SP3 ? S4 |
| 97 | | CAR, R/FA ? $\overline{POS}$ | |
| | | R/SP3 ? POS | |
| 98 | W/SP3 | SL2 | |
| 99 | | W/PVC | |

| STEP | | |
|---|---|---|
| 1794 | CAR, R/PVA | |
| 1795 | R/SP1 | |
| 1796 | W/PVA ? SDZ | |

CHART C-1

FUNCTIONAL OPERATIONS PECULIAR TO MODE 2

| 2300 | 2800 |
|---|---|
| /73<br>Supply end point coordinates to servo command registers, and set ΔX, ΔY, PVA to zero if full stop required. | Ditto |
| 76 — Transfer GB to GA<br><br>Transfer IB to I<br><br>Transfer JB to J<br><br>_81 | Ditto |
| Adv. to S8 ? S7 | Ditto |
| 82<br><br>99 | |

TABLE IIIA
STEPS PECULIAR TO MODE 2

| | 2300 | 2800 |
|---|---|---|
| 1 to 72 | | |
| 73 | CAR, R/XCEP | ⟶ |
| 74 | W/XCP ? S7·(POS + CYSP)<br>CAR, R/YCEP | ⟶ |
| 75 | W/YCP ? S7 (POS + CYSP), CAR | ⟶ |
| 76 | W/ΔX ? (POS + CYSP)<br>W/ΔY ? (POS + CYSP)<br>W/PVA ? (POS + CYSP)<br>R/SP3 ? S7 | ⟶ |
| 77 | W/Q ? S7, CAR | ⟶ |
| 78 | R/GB ? S7 $\overline{G09}$ | ⟶ |
| 79 | W/G ? S7, CAR<br>R/IB ? S7 LIN $\overline{CYSP}$ | ⟶ |
| 80 | W/I ? S7 LIN, CAR<br>RJB ? S7 LIN $\overline{CYSP}$ | ⟶ |
| 81 | W/J ? S7 LIN, CAR | ⟶ |
| 82 | Adv. to S8 ? 77 | ⟶ |
| | NONE | |

I claim as my invention:

1. The method of controlling the velocity of an element movable along a path to a commanded end point, comprising the steps of
   a. measuring off successive, equal periods ΔT in actual time,
   b. signaling a first number which is changeable during each ΔT and which is proportional by a given factor to the desired velocity at which said element is to be moved,
   c. moving the member toward the end point a distance ΔU during each period ΔT and controlling said distance ΔU directly or indirectly from said first number to make the velocity ΔU/ΔT be always substantially equal to said desired velocity,
   d. signaling a changeable second number which during each period ΔT represents the remaining distance between the then-existing position of the element and said end point,
   e. deriving and signaling from said signaled second number a changeable third number which is a function of said remaining distance and which during each period ΔT is proportional by said factor to a schedule velocity, said schedule velocity being that at which said element must then by moving to make its velocity at the end point substantially zero if its velocity is made a predetermined fraction C of its previous velocity during each subsequent period ΔT, and
   f. setting said first number to equal said third number during and period ΔT when the first number exceeds the third number.

2. The method set forth in claim 1 wherein
   i. said changeable first number is PVA,
   ii. said distance ΔU is equal to PVA·ΔT,
   iii. said changeable second number is $R_p = U_{ep} - U_{pp}$,
   iv. said changeable third number signaled during each period ΔT is equal to $R_p(1-C)/\Delta T$, and
   v. said step (f) includes setting the first number PVA equal to $R_p(1-C)/\Delta T$ during each period ΔT when PVA ⩾ $R_p(1-C)/\Delta T$.

3. The method set forth in claim 1 wherein
   i. said first changeable number is ΔU
   ii. said step (c) includes moving the element ΔU per ΔT and at a velocity equal to ΔU/ΔT where ΔT is a predetermined constant,
   iii. said changeable second number signaled during each period ΔT is $R_p = U_{ep} - U_{pp}$,
   iv. said changeable third number signaled during each period ΔT is equal to $R_p(1-C)$, and
   v. said step (f) includes setting the first number ΔU equal to $R_p(1-C)$ during each period ΔT when ΔU ⩾ $R_p(1-C)$.

4. The method set forth in claim 1 wherein said step (f) includes setting said first number equal to said third number during any period ΔT when the first number exceeds the third number and is also greater than a predetermined constant representing a creep speed Vf, whereby the velocity of the element prior to reaching the end point does not fall below $V_f$, 5. The method set forth in claim 2 wherein said changeable third number is equal to $R_p(1-C)/\Delta T + M$, where M is predetermined constant representing a minimum velocity $V_f$ to which PVA will be reduced as $R_p$ reaches zero.

6. The method set forth in claim 2 wherein said changeable third number is equal to $R_p(1-C) + M$, where M is a predetermined constant and $M \cdot \Delta T$ represents a minimum velocity $V_f$ to which the elements velocity can be reduced as $R_p$ reaches zero.

7. The method of controlling the velocity of an element movable along a path U to a commanded end point $U_{ep}$, comprising the steps of
  a. measuring off in actual time successive equal periods $\Delta T$,
  b. signaling a first changeable number proportional to the commanded velocity at which the element is to be moved,
  c. moving the element along the path a distance $\Delta U$ during each period $\Delta T$, where $\Delta U$ is proportional to the signaled first number, to make the element move at a velocity equal to $\Delta U/\Delta V$ and equal to the commanded velocity,
  d. computing and signaling during each period $\Delta T$ the remaining distance $R_p$ to be traveled by the element from its then existing position to the end point,
  e. computing and signaling, from said signaled first number and distance during each period $\Delta T$, a look-ahead distance LAD which the element will travel in reaching zero velocity if its then existing velocity is decremented to a predetermined fraction C of its previous value during each of succeeding periods $\Delta T$, where C is a predetermined constant less than 1.0, and
  f. changing the first signaled number to be equal to said predetermined fraction C of its previous value during each period $\Delta T$ when said signaled look-ahead distance LAD is equal to or greater than said signaled remaining distance $R_p$, until said first number is reduced to a predetermined minimum value.

8. The method set forth in claim 7, wherein said step (e) includes computing and signaling during each period $\Delta T$ a look-ahead distance number LAD which is proportional to the value of $$V_0 \Delta T \sum_{n=0}^{n=\infty} C^n$$

where $V_0$ is the then-existing velocity of the element.

9. The method set forth in claim 8 wherein said distance number LAD is computed and signaled as being equal to $(V_0 \cdot \Delta T)/(1-C)$.

10. The method set forth in claim 7, wherein said step (e) includes computing and signaling during each period $\Delta T$ a look-ahead distance number LAD which is proportional to the value $(\Delta U)/(1-C)$, where $\Delta U$ is the then existing value of the quantity $\Delta U$ named in step (c).

11. The method set forth in claim 7, wherein said step (e) includes computing and signaling during each period $\Delta T$ a look-ahead distance number LAD which is proportional to said first number and therefore proportional to $[\Delta U]/[\Delta T(1-C)]$.

12. The method set forth in claim 10 wherein said step (f) includes comparing during each period $\Delta T$ the then existing value of $\Delta U$ with the then existing value of $R_p(1-C)$, and changing said first number to said fraction C of its previous value during each period $\Delta T$ after such comparing first indicates that the first of the two compared values equals or exceeds the second.

13. The method set forth in claim 11, wherein said step (f) includes comparing during each period $\Delta T$ the then existing value of said first number with the then existing value of $[R_p(1-C)]/\Delta T$ and changing said first number to said fraction C of its previous value during the $\Delta T$ periods following that in which the first of the two compared values equals or exceeds the second.

14. The method set forth in claim 10 wherein said step (f) further includes said changing of the values of said signaled first number by making it equal to $R_p(1-C)$.

15. The method set forth in claim 13, wherein said step (f) further includes said changing of said signaled first number by setting it to a new value which is equal to the then existing value of $[R_p(1-C)]/\Delta T$.

16. In a system wherein a movable element is translated at a velocity corresponding to a signaled number PVA by causing the element to move through a distance corresponding to a signaled number $\Delta U$ during each of successive equal time periods $\Delta T$, where the signaled number PVA is changeable from instant to instant and the signaled number $\Delta U$ is proportional to $PVA \times \Delta T$ during each period $\Delta T$, the method of signaling on a substantially continuous basis the distance LAD which the element will travel before reaching zero velocity if, beginning during any period $\Delta T_o$, its velocity PVA is changed to a predetermined fraction C (where C is a constant less than 1.0 ) of the previous value during each of the subsequent periods $\Delta T$, said method comprising computing and signaling during each period $\Delta T$ a number LAD which is equal to $V_0 \cdot \Delta T \cdot 1/(1-C)$, where $V_0$ is the value of PVA during that period.

17. The method set forth in claim 16 further characterized in that the number LAD is computed and signaled during each period $\Delta T$ as being equal to $\Delta U/(1-C)$.

18. The method set forth in claim 16 further including the step of signaling, during any period $\Delta T$, that the distance LAD is greater than a remaining distance $R_p$, and wherein during each period $\Delta T$ two numbers respectively proportional by the same factors to $\Delta U$ and $R_p(1-C)$ are compared, and signal SDZ is produced whenever the former number exceeds the latter.

19. In a method for controlling the velocity of a movable element by iteratively incrementing a signaled number USC by amounts $\Delta U$ during successive equal time periods $\Delta T$ and causing the element to move dynamically along an axis U in accordance with changes in the number USC, the velocity of the element thus being proportional to $\Delta U/\Delta T$ and determined by the incrementing amount $\Delta U$, the improvement for decelerating the element to substantially zero velocity and which comprises the steps of
  a. producing a signal SDZ during the period $\Delta T$ when deceleration to zero is to begin, and
  b. in response to said signal SDZ reducing the incrementing amount $\Delta U$ by a predetermined percentage C during each successive period $\Delta T$, such that $\Delta U_{n+1} = C\Delta U_n$.

20. The method set forth in claim 19 wherein said step (a) includes
   - a1. signaling during each period $\Delta T$ a numerical value $R_p$ representing the distance remaining for the element to travel to reach a stopping point at which its velocity is to be zero,
   - a2. signaling during each period $\Delta T$ a numerical value LAD representing the distance which the element will travel if said step (b) is initiated during that particular period,
   - a3. comparing said signaled values LAD and $R_p$ during each period $\Delta T$ and producing said signal SDZ when the latter value equals or exceeds the former.

21. The method set forth in claim 20 wherein said steps (a2) and (a3) include signaling and comparing during each period $\Delta T$ the values of $\Delta U$ and $R_p(1-C)$ to produce the signal SDZ when the former value equals or exceeds the latter.

22. The method set forth in claim 21 wherein said step (b) includes setting said incrementing amount $\Delta U$ to a new value during each period $\Delta T$ such that $\Delta U_{n+1} = R_p(1-C)$.

23. In an apparatus for controlling the velocity of an element movable along a path to a commanded end point, said apparatus including
   - a. means for measuring off successive, equal periods $\Delta T$ in actual time,
   - b. means for signaling a first number which is changeable during each $\Delta T$ and which is proportional by a given factor to the desired velocity at which the element is to be moved,
   - c. means for moving the member toward the end point a distance $\Delta U$ during each period $\Delta T$ and controlling said distance $\Delta U$ directly or indirectly from said first number to make the velocity $\Delta U/\Delta T$ be always substantially equal to said desired velocity, and
   - d. means for signaling a changeable second number which during each period $\Delta T$ represents the remaining distance between the then existing position of the element and said end point, the improvement which comprises
   - e. means for deriving and signaling from said signaled second number a changeable third number which is a function of said remaining distance and which during each period $\Delta T$ is proportional by said factor to a schedule velocity, said schedule velocity being that at which said element must then be moving to make its velocity at the end point substantially zero if its velocity is changed to a predetermined fraction C of its previous velocity during each subsequent period $\Delta T$, and
   - f. means for setting said first number equal to said third number during any period $\Delta T$ when the first number exceeds the third number.

24. In apparatus for controlling the velocity of an element movable along a path U to a commanded end point $U_{ep}$, said apparatus including
   - a. means for measuring off in actual time successive, equal period $\Delta T$,
   - b. means for signaling a first changeable number proportional to the desired velocity at which the element is to be moved,
   - c. means responsive to the signals representing said first number for driving the element along the path an incremental distance $\Delta U$ during each period $\Delta T$ to make the actual velocity equal to $\Delta U/\Delta T$, where $\Delta U$ is proportional to said first number,
   - d. means for determining and signaling a second changeable number which during each period $\Delta T$ represents the remaining distance $R_p$ between the then-existing position of the element and the end point position,
   the improvement which comprises, in combination
   - e. means responsive to the signals representing said first and second numbers for signaling during each period $\Delta T$ a third changeable number representing a look-ahead distance LAD which the element will travel in reaching zero velocity if its then existing actual velocity is decremental during each period $\Delta T$ to a predetermined percentage C of its previous value, where C is a constant less than 1.0, and
   - f. means responsive to the signals representing said first, second and third numbers for changing the first number to said predetermined fraction C of its previous value during each period $\Delta T$ when said third number equals or exceeds said second number until said first number is reduced to a predetermined minimum value.

25. The combination set forth in claim 24 further characterized in that said means (e) includes means for signaling during each period $\Delta T$ a third changeable number which is equal to $V_0 \cdot \Delta \cdot 1/(1-C)$, where $V_0$ is the velocity at which said element is then moving, $\Delta T$ is numerically the length of said time periods, and C is said predetermined percentage.

26. The combination set forth in claim 24 further characterized in that
   - i. said signaled first number represents numerically a velocity PVA, and said incremental distance $\Delta U$ is equal to $PVA \cdot \Delta T$,
   - ii. said means (e) for signaling a third number comprises means responsive to the signals representing said second number for signaling the third number with a value representing $R_p(1-C)/\Delta T$,
   - iii. said means (f) includes means for setting said first number to a new value $PVA_i$ which is equal to said third number during any period $\Delta T$ when the first number value $PVA_{i-1}$ equals or exceeds the value of the third number.

27. The combination set forth in claim 24 further characterized in that
   - i. said signaled first number represents numerically an incremental distance $\Delta U$, and said means (c) includes means for driving the element, during each period $\Delta T$, an incremental distance which is equal to the value of the first number,
   - ii. said means (e) for signaling a third number comprises means responsive to the signals representing said second number for signaling the third number with a value representing $R_p(1-C)$, and
   - iii. said means (f) includes means for setting said first number $\Delta U$ to a new value $\Delta U_i$ which is equal to said third number during any period $\Delta T$ when the first number value $\Delta U_{i-1}$ equals or exceeds the value of the third number.

* * * * *

PO-1050
(5/69)

UNITED STATES PATENT OFFICE
CERTIFICATE OF CORRECTION

Patent No. 3,798,427　　　　　　　　Dated March 19, 1974

Inventor(s) John P. Conners　　　　　　Page 1 of 1

It is certified that error appears in the above-identified patent and that said Letters Patent are hereby corrected as shown below:

Column 8, line 21, "$V_\Delta T$" is changed to --$V^\infty \Delta T$--.

Line 34, "$C-$" is changed to --$C^\infty$--.

Column 14, line 33, "if" is changed to --is--.

Column 20, line 55, before "assuming", -- ( -- is inserted.

Column 31, line 64, "by" is changed to --be--.

Column 35, line 63, "period" is changed to --periods--.

Signed and sealed this 5th day of November 1974.

(SEAL)
Attest:

McCOY M. GIBSON JR.　　　　　　　C. MARSHALL DANN
Attesting Officer　　　　　　　　　Commissioner of Patents